(12) United States Patent
Wu

(10) Patent No.: US 11,495,846 B2
(45) Date of Patent: Nov. 8, 2022

(54) SECONDARY AGGREGATE BATTERY WITH SPATIAL SEPARATION OF OPERATION TEMPERATURES

(71) Applicant: Donald P. H. Wu, Hsinchu County (TW)

(72) Inventor: Donald P. H. Wu, Hsinchu County (TW)

(*) Notice: Subject to any disclaimer, the term of this patent is extended or adjusted under 35 U.S.C. 154(b) by 1000 days.

(21) Appl. No.: 16/115,541

(22) Filed: Aug. 28, 2018

(65) Prior Publication Data

US 2020/0076021 A1  Mar. 5, 2020

(51) Int. Cl.
*H01M 10/6551* (2014.01)
*H02J 7/00* (2006.01)
*H01M 10/613* (2014.01)
*H01M 10/42* (2006.01)
*H01M 10/48* (2006.01)
*H01M 10/46* (2006.01)
(Continued)

(52) U.S. Cl.
CPC ..... *H01M 10/6551* (2015.04); *H01M 10/425* (2013.01); *H01M 10/46* (2013.01); *H01M 10/482* (2013.01); *H01M 10/486* (2013.01); *H01M 10/613* (2015.04); *H01M 10/653* (2015.04); *H01M 50/20* (2021.01); *H02J 7/0014* (2013.01); *H02J 7/0026* (2013.01); *H02J 7/0042* (2013.01); *H01M 2010/4271* (2013.01)

(58) Field of Classification Search
CPC ......... H01M 10/4257; H01M 10/6551; H01M 10/482; H01M 10/486; H02J 7/0042; H02J 7/0014
See application file for complete search history.

(56) References Cited

U.S. PATENT DOCUMENTS 5,689,173 A * 11/1997 Oosaki ............... H01M 10/486 429/7
6,326,766 B1 * 12/2001 Small ................. H02J 7/0045 320/112
(Continued)

FOREIGN PATENT DOCUMENTS

CN  103443960 A  * 12/2013 ........ H01M 10/0525
TW  I584515 B  5/2017

*Primary Examiner* — Drew A Dunn
*Assistant Examiner* — Tarikh Kanem Rankine
(74) *Attorney, Agent, or Firm* — Bruce Stone LLP; Joseph A. Bruce

(57) ABSTRACT

A secondary aggregate battery with spatial separation of operation temperatures is provided, including: a housing, wherein a plurality of secondary battery packs and a charge balancing system connected to the secondary battery packs are disposed in the housing. The charge balancing system includes a battery state detection unit and a heat dissipation component. The housing includes a heat dissipation chamber and an accommodation chamber separated by a partition. The heat dissipation chamber accommodates the heat dissipation component, and the accommodation chamber accommodates the secondary battery packs and the battery state detection unit such that the temperature of the heat dissipation component is isolated by the independent chamber to prevent the operation temperature of the heat dissipation component affects the normal operation of the secondary battery packs.

7 Claims, 8 Drawing Sheets

(51) Int. Cl.
*H01M 10/653* (2014.01)
*H01M 50/20* (2021.01)

(56) References Cited

U.S. PATENT DOCUMENTS

| | | | | |
|---|---|---|---|---|
| 6,326,767 | B1* | 12/2001 | Small | H02J 7/0045 |
| | | | | 320/116 |
| 6,805,993 | B2* | 10/2004 | Kaito | H01M 50/572 |
| | | | | 429/62 |
| 2002/0070709 | A1* | 6/2002 | Small | H02J 7/007194 |
| | | | | 320/150 |
| 2005/0110460 | A1 | 5/2005 | Juichi et al. | |
| 2008/0166627 | A1* | 7/2008 | Mori | H01M 10/44 |
| | | | | 429/61 |
| 2009/0195213 | A1* | 8/2009 | Li | H02J 7/0016 |
| | | | | 320/136 |
| 2011/0171505 | A1* | 7/2011 | Kishll | H01M 50/20 |
| | | | | 429/82 |
| 2013/0273400 | A1* | 10/2013 | Musetti | H01M 10/6555 |
| | | | | 429/81 |
| 2014/0334055 | A1* | 11/2014 | Namikawa | H01H 37/04 |
| | | | | 361/115 |
| 2015/0303528 | A1 | 10/2015 | Wu | |
| 2017/0110837 | A1* | 4/2017 | Taniguchi | H01R 13/6683 |

\* cited by examiner

SECONDARY AGGREGATE BATTERY WITH SPATIAL SEPARATION OF OPERATION TEMPERATURES

BACKGROUND

1. Technical Field

The present invention generally relates to a secondary aggregate battery and, more particularly, to a secondary aggregate battery having a charge balancing system.

2. Description of Related Art

Presently, to avoid overcharging, the secondary aggregate battery is provided with a charge balancing system for charging management of the secondary aggregate battery. The foregoing charge balancing system is mainly provided with at least one heat dissipation component as a means for battery balancing to prevent the operation temperature from affecting the normal operation of the battery. Therefore, for example, in Taiwan Patent No. 1584515 and U.S. patent application Ser. No. 14/584,577, a metallic battery housing is matched with a metallic heat sink installed outside of the battery housing, and a higher power heat dissipation component is selected to be disposed on the heat sink, thereby achieving a charge balancing operation of the secondary aggregate battery.

It is worth noting that the heat dissipation component and the metallic heat sink are disposed outside the battery housing and the metallic heat sink is only used for heat dissipation, which cannot completely shield the charge balancing system with sufficient protection. In addition, the metallic heat sink and the heat dissipation component are protruded from the outside of the battery housing, and practically there is a risk of damaging the metallic heat sink and the heat dissipation component due to collision, which may further damage a secondary battery pack operating in parallel therewith. Therefore, the battery housing should be structurally redesigned to prevent the charge balancing system from being damaged due to collision to causes safety concern about the secondary aggregate battery. Furthermore, it is also necessary to consider that the operation temperature owing to the operation of the heat dissipation component is higher than the normal operation temperature of the secondary battery pack and that the secondary battery pack is liable to be defective when the ambient temperature of the secondary battery pack is higher than the normal operation temperature. For example, the secondary battery pack may unstably or inefficiently charge and discharge. Accordingly, the relatively high operation temperature owing to the operation of the heat dissipation component has to be prevented from affecting the normal operation temperature of the secondary battery pack. Consequently, a secondary battery with high safety and effective isolation from the operation temperature of the heat dissipation component is required.

In addition, as in US Patent Publication No. 2005/0110460, it is also provided with a battery housing as a plurality of secondary battery packs and a charge balancing system outside the battery housing, which results in a significant safety risk to the overcharge/discharge device that is disposed externally and is liable to be damaged due to collision. The circuit component and the heat dissipation component of the charge balancing system are disposed in the same space. The heat dissipation component has a longer lifetime and a higher temperature resistance than the circuit component of the charge balancing system in the same space. Consequently, the relatively high operation temperature of the heat dissipation component may easily and adversely affect the circuit component of the charge balancing system. Accordingly, a secondary battery with high safety and effective isolation from the operation temperature of the heat dissipation component is required.

BRIEF SUMMARY OF THE INVENTION

Accordingly, the present invention provides a secondary aggregate battery with spatial separation of operation temperatures. A primary object of the present invention is to prevent the charge balancing system from being damaged and, in the meantime, effectively isolate the operation temperature produced by the heat dissipation component to avoid affecting the normal operation temperature of the secondary battery pack, thereby improving the operation safety of the secondary aggregate battery.

A secondary object of the present invention is to enable overcharge/discharge protection and replacement of the secondary battery pack of a single module so as to achieve effective protection and rapid maintenance.

To achieve the foregoing objects, in a first embodiment of the present invention, a secondary aggregate battery with spatial separation of operation temperatures includes: a housing, wherein a heat sink, at least one secondary battery pack and a charge balancing system are disposed in the housing. The heat sink is made of a metal material. The charge balancing system includes at least one battery state detection unit and at least one heat dissipation component electrically connected thereto. The heat dissipation component is configured to dissipate overcharge energy of the secondary battery pack.

The housing includes a heat dissipation chamber and an accommodation chamber separated by a partition. The heat sink and the heat dissipation component are fixedly disposed in the heat dissipation chamber. The secondary battery pack and the battery state detection unit are disposed in the accommodation chamber. The battery state detection unit and the secondary battery pack are electrically connected. The battery state detection unit and the secondary battery pack corresponding thereto are electrically connected into a module form. The battery state detection unit detects a state of the secondary battery pack corresponding thereto in the same module to control charge/discharge of the secondary battery pack. The battery state detection unit includes a detection unit, a comparison unit and a control unit being electrically connected. The detection unit is configured to detect the potential of the secondary battery pack. The comparison unit is provided with a pre-determined range value. The control unit is configured to control discharge of the secondary battery pack being electrically connected thereto.

Thereby, the heat dissipation chamber and the accommodation chamber in the housing isolate the heat dissipation component with a relatively high operation temperature from the battery state detection unit and the secondary battery pack that have to maintain a relatively low operation temperature. The battery state detection unit independently detects the potential of the secondary battery pack. The comparison unit compares the pre-determined range value to the detected potential. The control unit controls the secondary battery pack to discharge electric energy to the heat dissipation component when the potential of the secondary battery pack exceeds the pre-determined range value.

As stated above, in the present invention, the heat dissipation component and the heat sink with a relatively higher operation temperature are independently disposed in the heat dissipation chamber so as to be isolated from the battery state detection unit and the secondary battery packs that have to maintain a relatively low operation temperature in the accommodation chamber. Such spatial separation isolates the temperature of the heat dissipation component to prevent the relatively high operation temperature of the heat dissipation component from affecting the secondary battery packs and the battery state detection unit such that the secondary battery packs and the battery state detection unit can operate at a relatively low normal operation temperature.

Moreover, the secondary battery packs and the charge balancing system of the present invention are all disposed in the housing such that the protection of the charge balancing system is improved by the use of the housing to achieve the safety of the charge balancing system.

Furthermore, the battery state detection unit independently detects the potential of each of the secondary battery packs to protect the secondary battery packs individually. Consequently, when a certain secondary battery pack fails, the secondary battery pack and the battery state detection unit can be replaced by module without replacing the undamaged secondary battery pack and the heat dissipation component with a longer lifetime to achieve effective protection and rapid maintenance.

DETAILED DESCRIPTION OF THE INVENTION

Figure 1:
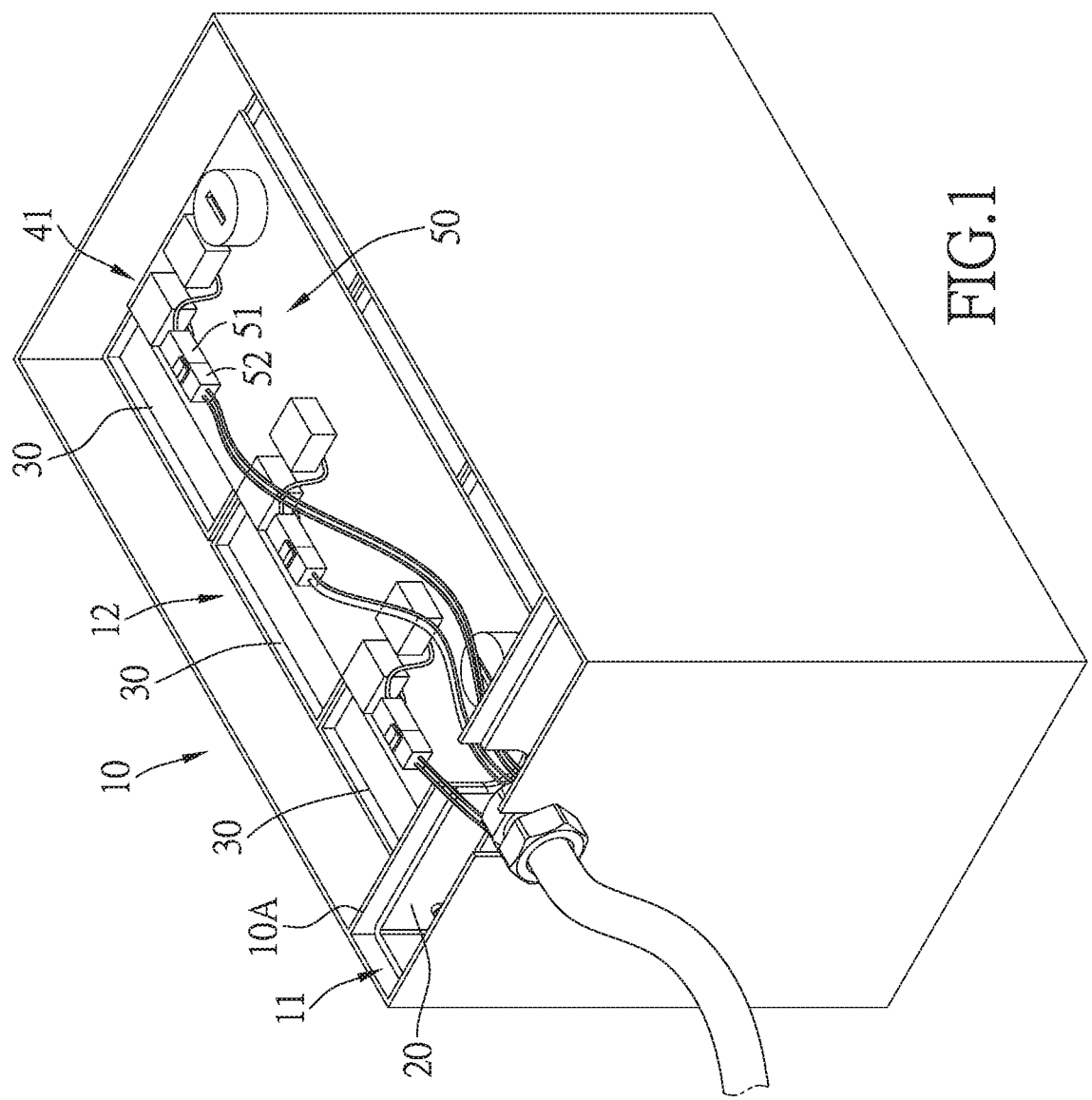
FIG. 1 is a perspective view according to a first embodiment of the present invention.
Figure 2:
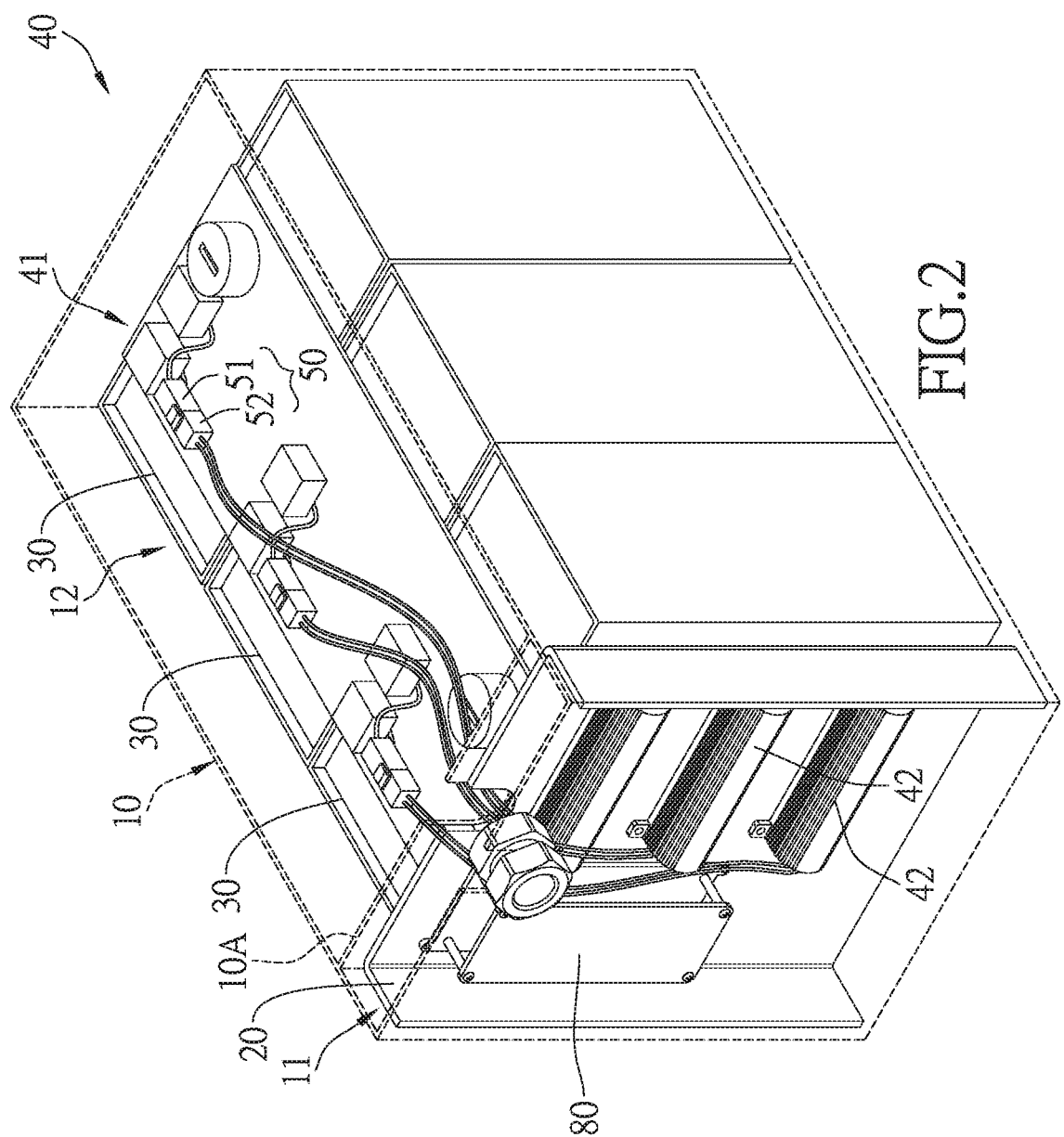
FIG. 2 is a perspective view according to a first embodiment of the present invention.
Figure 3:
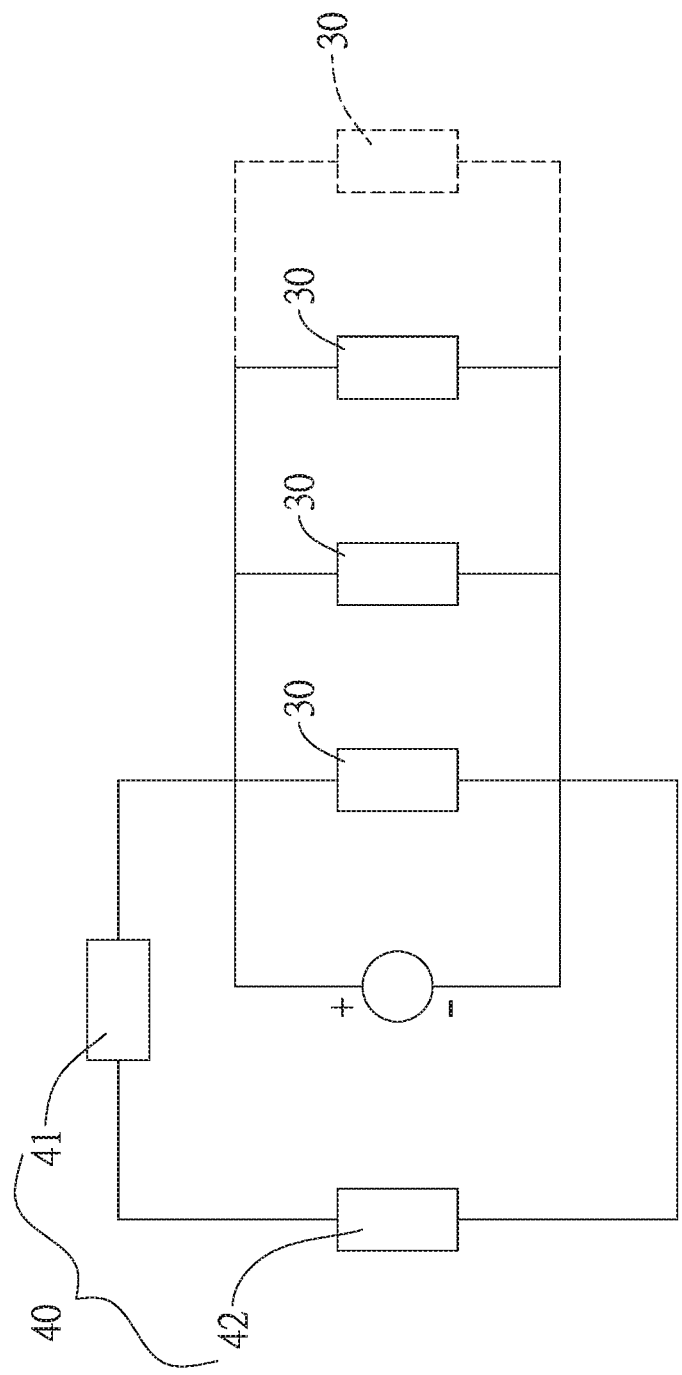
FIG. 3 is a schematic circuit diagram according to a first embodiment of the present invention.
Figure 4:
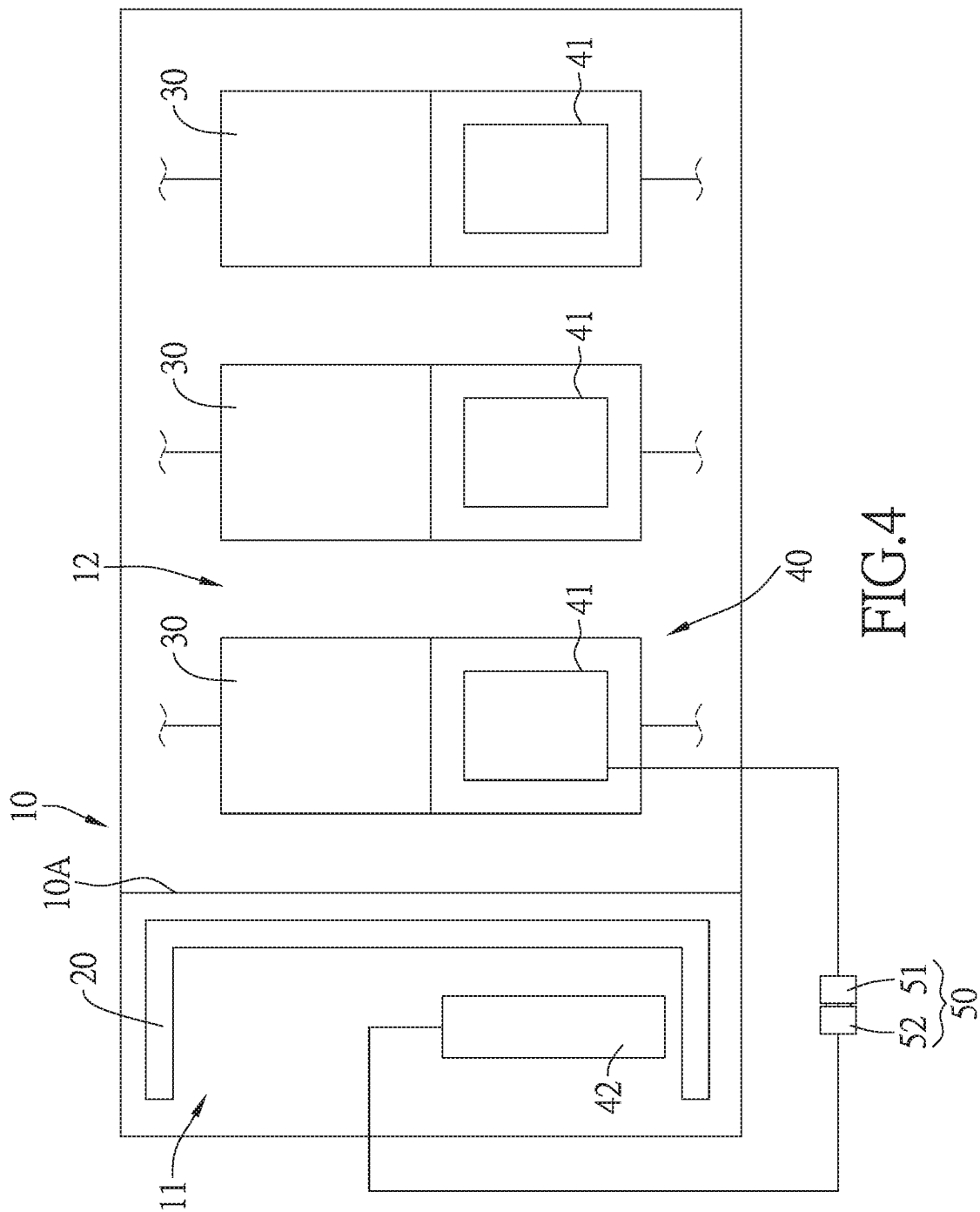
FIG. 4 is a schematic structural diagram according to a first embodiment of the present invention.

The present invention provides a secondary aggregate battery with spatial separation of operation temperatures. In the first embodiment, as shown in FIGS. 1, 2, 3, and 4, the secondary aggregate battery with spatial separation of operation temperatures includes a housing 10 having an open concave space therein, and a partition 10A is provided along an opening to the bottom of the inner space of the housing 10 to divide the inner space of the housing 10 into a heat dissipation chamber 11 and an accommodation chamber 12, which are two heat insulations separated from each other and each has a concave space.

A heat sink 20 is fixedly disposed in the heat dissipation chamber 11, and the heat sink 20 is made of a metal material.

At least one secondary battery pack 30 is disposed in the accommodation chamber 12. In the present embodiment, the secondary battery pack 30 includes a plurality of secondary batteries.

A charge balancing system 40 includes at least one battery state detection unit 41 and at least one heat dissipation component 42. The battery state detection unit 41 is disposed in the accommodation chamber 12. The battery state detection unit 41 is electrically connected to the secondary battery pack 30 corresponding thereto. The battery state detection unit 41 and the secondary battery pack 30 corresponding thereto are electrically connected into a module form. The battery state detection unit 41 detects a state of the secondary battery pack 30 corresponding thereto in the same module so as to facilitate detecting the integrity of the secondary battery pack 30 for rapid maintenance or replacement. The battery state detection unit 41 detects the voltage of the secondary battery pack 30 to control charge/discharge of the secondary battery pack 30 to maintain a normal operation temperature that is lower than the operation temperature of the heat dissipation component 42. The heat dissipation component 42 is fixedly disposed in the heat dissipation chamber 11. The battery state detection unit 41 is electrically connected to the heat dissipation component 42. The heat dissipation component 42 is configured to dissipate the overcharge energy of the secondary battery pack 30. The heat dissipation component 42 is accommodated in the heat dissipation chamber 11 and operates at a relatively high operation temperature with respect to the secondary battery pack 30. However, the thermal isolation between the heat dissipation chamber 11 and the accommodation chamber 12 reliably avoids the interaction of the operation temperatures. The number of the battery state detection unit 41 and the number of the heat dissipation component 42 may vary according to the capacity and the load of the secondary battery.

At least one connector set 50 includes a first connector 51 and a second connector 52. The first connector 51 is electrically connected to the corresponding battery state detection unit 41. The second connector 52 is electrically connected to the corresponding heat dissipation component 42. The first connector 51 is detachably coupled to the second connector 52.

Thereby, the battery state detection unit 41 independently detects the potential of the corresponding secondary battery pack 30, and controls the corresponding secondary battery pack 30 to discharge the electrical energy to the heat dissipation component 42 electrically connected thereto.

Figure 5:
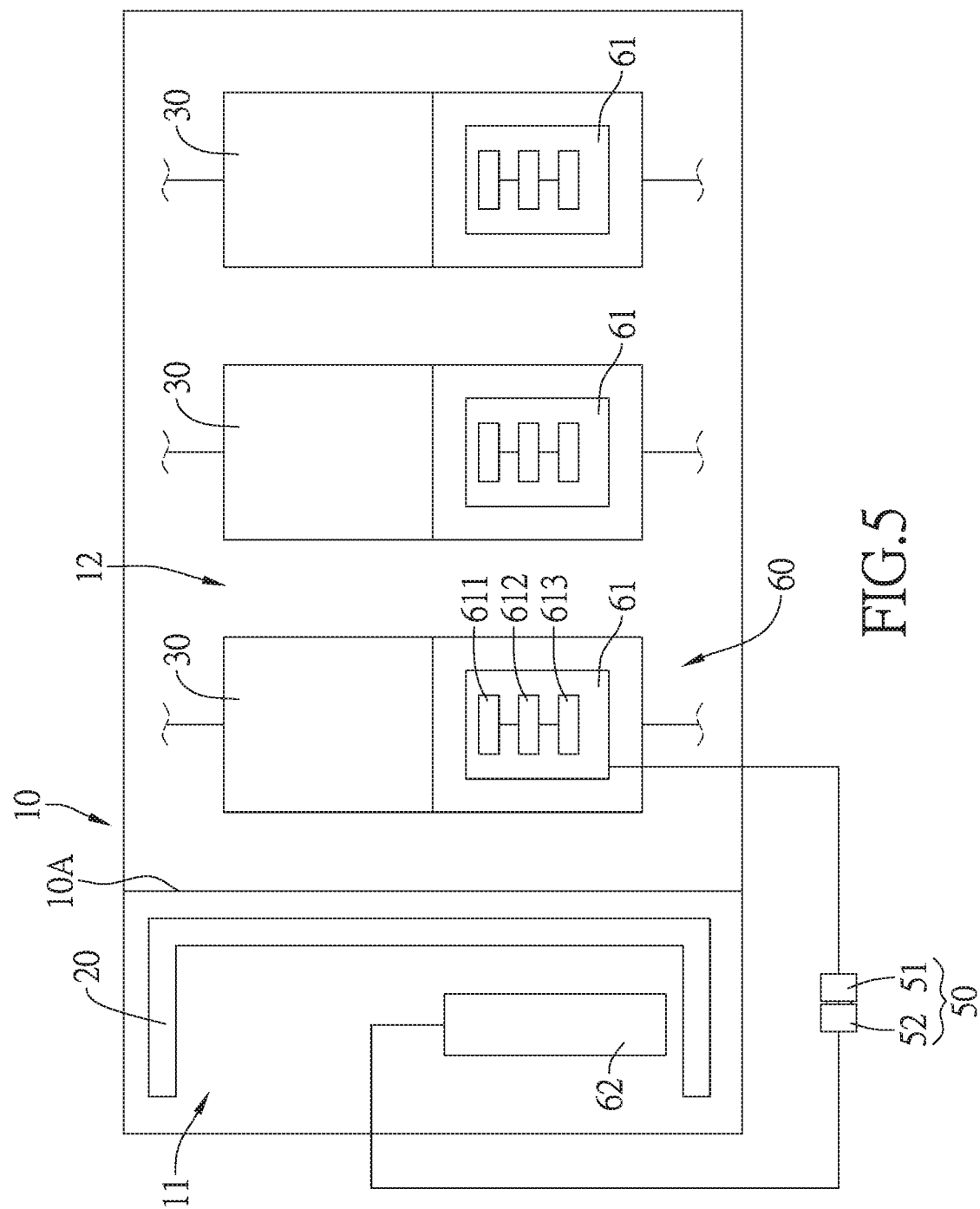
FIG. 5 is a schematic structural diagram according to a second embodiment of the present invention.

The second embodiment of the present invention will be described herein. Before the detailed description is made, it is noted that, in the following description, similar elements are denoted by the same reference numerals, as shown in FIG. 5.

A housing 10 has an open concave space therein, and a partition 10A is provided along an opening to the bottom of the inner space of the housing 10 to divide the inner space of the housing 10 into a heat dissipation chamber 11 and an accommodation chamber 12, which are two heat insulations separated from each other and each has a concave space.

A heat sink 20 is fixedly disposed in the heat dissipation chamber 11, and the heat sink 20 is made of a metal material.

At least one secondary battery pack 30 is disposed in the accommodation chamber 12.

A charge balancing system 60 includes at least one battery state detection unit 61 and at least one heat dissipation component 62. The battery state detection unit 61 is disposed in the accommodation chamber 12. The battery state detection unit 61 is electrically connected to the secondary battery pack 30 corresponding thereto. The battery state detection unit 61 and the secondary battery pack 30 corresponding thereto are electrically connected into a module form. The battery state detection unit 61 detects a state of the secondary battery pack 30 corresponding thereto in the same module so as to facilitate detecting the integrity of the secondary battery pack 30 for rapid maintenance or replacement. The battery state detection unit 61 includes a detection unit 611, a comparison unit 612 and a control unit 613 being electrically connected. The detection unit 611 is configured to detect the potential of the secondary battery pack 30. The comparing unit 612 is provided with a pre-determined range value. The control unit 613 is configured to control discharge of the secondary battery pack 30. The heat dissipation component 62 is fixedly disposed in the heat dissipation chamber 11. The battery state detection unit 61 is electrically connected to the heat dissipation component 62. The heat dissipation component 62 is configured to dissipate the overcharge energy of the secondary battery pack 30.

At least one connector set 50 includes a first connector 51 and a second connector 52. The first connector 51 is electrically connected to the corresponding battery state detection unit 61. The second connector 52 is electrically connected to the corresponding heat dissipation component 62. The first connector 51 is detachably coupled to the second connector 52.

Thereby, the detection unit 611 detects the potential of the corresponding secondary battery pack 30, the comparing unit 612 compares the detected potential to the pre-determined range value, and the control unit 613 controls the secondary battery pack 30 to discharge the electric energy to the heat dissipation component 62 when the potential of the secondary battery pack 30 exceeds the pre-determined range value.

Figure 6:
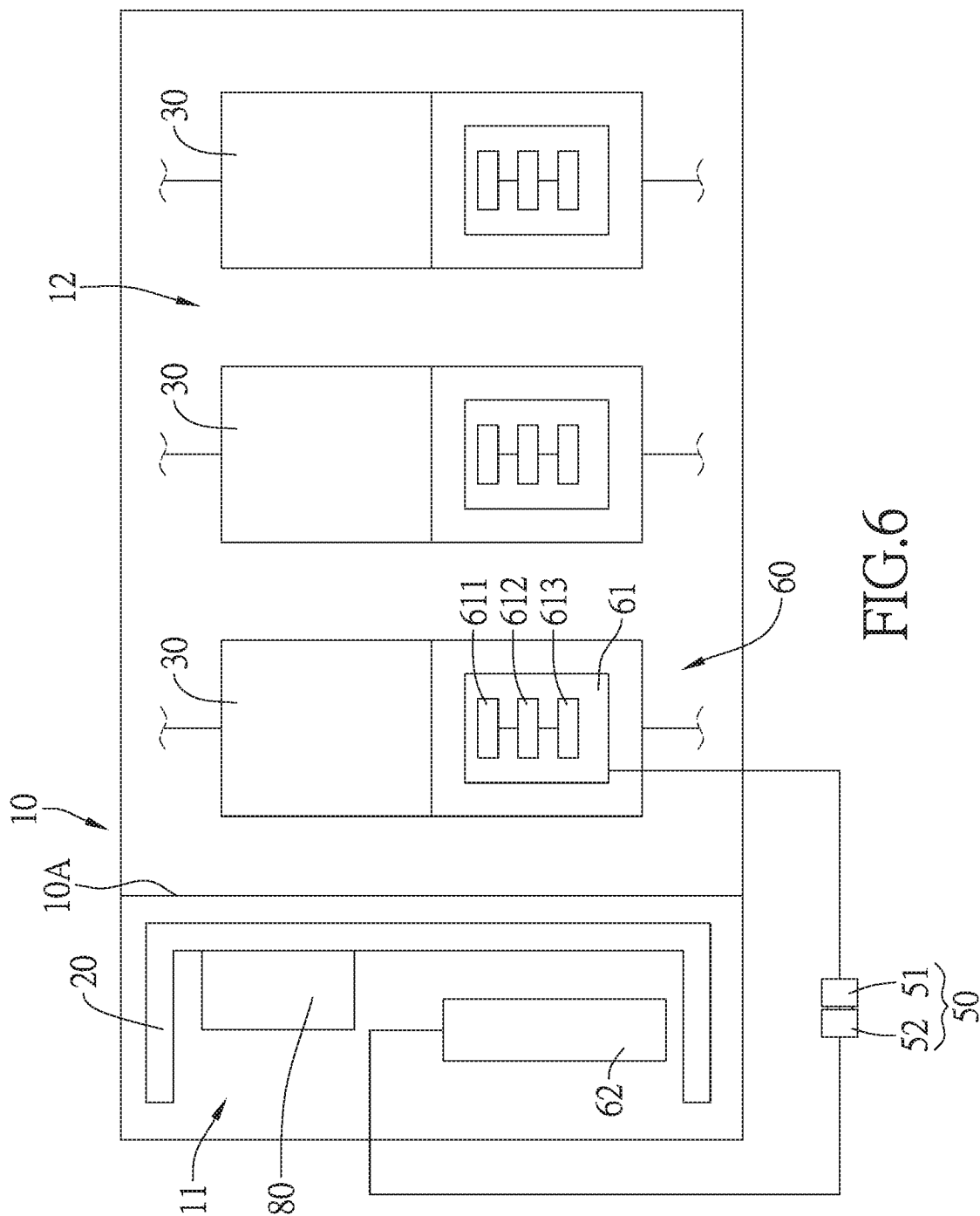
FIG. 6 is a schematic structural diagram of a first preferred implementation according to a second embodiment of the present invention.
Figure 7:
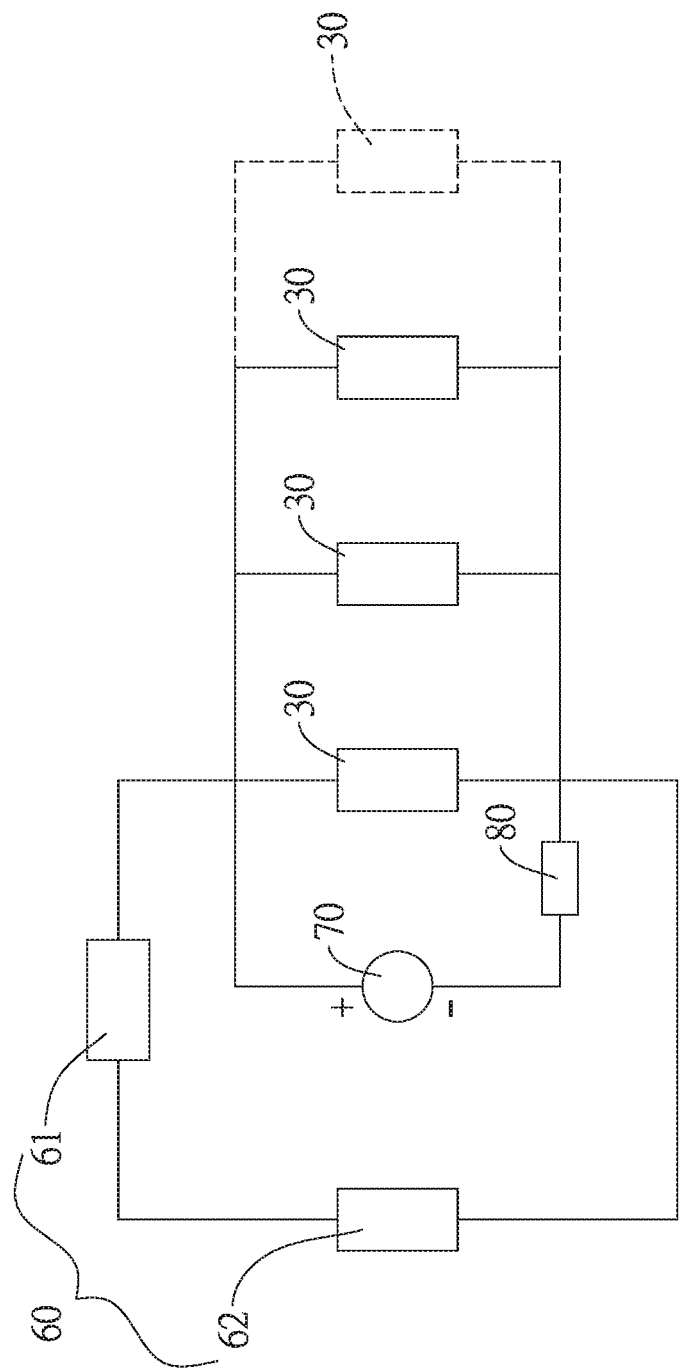
FIG. 7 is a schematic circuit diagram of a first preferred implementation according to a second embodiment of the present invention.

In a first preferred implementation according to a second embodiment of the present invention, as shown in FIG. 6 and FIG. 7, each of the secondary battery packs 30 is connected to a main control unit 70, and further includes a temperature switch 80. The temperature switch 80 is attached onto the heat sink 20. The temperature switch 80 is provided with a threshold value. The temperature switch 80 is controllably connected to the main control unit 70. The temperature switch 80 is configured to detect a temperature such that the temperature switch 80 controls the main control unit 70 to turn off when the temperature exceeds the threshold value.

Figure 8:
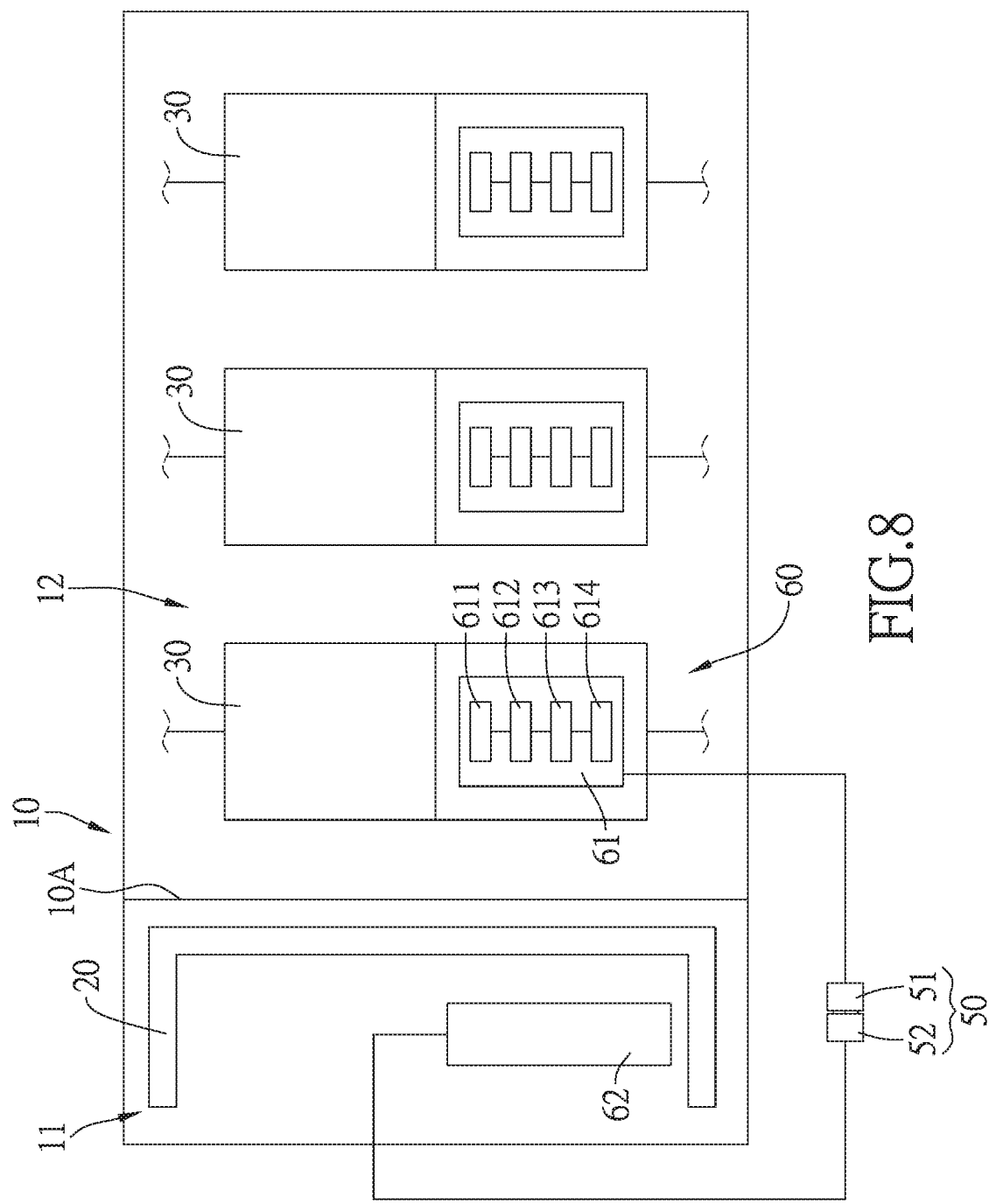
FIG. 8 is a schematic structural diagram of a second preferred implementation according to a second embodiment of the present invention.

In a second preferred implementation according to a second embodiment of the present invention, as shown in FIG. 8, the battery state detection unit 61 further includes a protection switch 614. The comparison unit 612 is provided with a limit value such that the protection switch 614 controls the secondary battery pack 30 corresponding thereto to become an open circuit when the potential of the secondary battery pack 30 reaches the limit value.

In both of the foregoing embodiments, the components having different operation temperatures are isolated by the spatial isolation between the heat dissipation chamber 11 and the accommodation chamber 12 in the housing 10. In other words, the heat dissipation component 62 having a relatively high operation temperature is effectively isolated from the battery state detection unit 61 and the secondary battery pack 30 that have to maintain a relatively low operation temperature to ensure that the battery state detection unit 61 and the secondary battery pack 30 can operate in the accommodation chamber 12 at normal operation temperatures without being affected by the relatively high operation temperature in the heat dissipation chamber 11. In addition, the secondary battery pack 30 and the battery state detection unit 61 can be repaired and replaced by module to improve the efficiency and safety of the maintenance of the secondary battery pack.

What is claimed is:

1. A secondary aggregate battery with spatial separation of operation temperatures, comprising:
a housing, wherein at least one secondary battery pack and a charge balancing system are disposed in said housing, said charge balancing system comprising at least one battery state detection unit and at least one heat dissipation component electrically connected thereto, and said heat dissipation component being configured to dissipate corresponding overcharge energy of said secondary battery pack, which is characterized in that: said housing comprises a heat dissipation chamber and an accommodation chamber separated by a partition, said heat dissipation component being fixedly disposed in said heat dissipation chamber, said secondary battery pack and said battery state detection unit being disposed in said accommodation chamber, said battery state detection unit and said secondary battery pack being electrically connected, said battery state detection unit and said secondary battery pack corresponding thereto being electrically connected into a module form, and said battery state detection unit detecting a state of said secondary battery pack corresponding thereto in the same module to control charge/discharge of said secondary battery pack; hereby, said heat dissipation chamber and said accommodation chamber in said housing isolate said heat dissipation component with a relatively high operation temperature from said battery state detection unit and said secondary battery pack that have to maintain a relatively low operation temperature, and said battery state detection unit respectively detects the potential of said secondary battery pack corresponding thereto to control said secondary battery pack to discharge electric energy to said heat dissipation component.

2. The secondary aggregate battery with spatial separation of operation temperatures according to claim 1, further comprising at least one connector set comprising a first connector and a second connector, wherein said first connector is electrically connected to said battery state detection unit, said second connector is electrically connected to said heat dissipation component, and said first connector is detachably coupled to said second connector.

3. The secondary aggregate battery with spatial separation of operation temperatures according to claim 1, wherein a heat sink is further provided in said housing, said heat sink being made of a metal material and being combined with said heat dissipation component to be accommodated in said heat dissipation chamber in said housing.

4. A secondary aggregate battery with spatial separation of operation temperatures, comprising:
a housing, wherein a heat sink, at least one secondary battery pack and a charge balancing system are disposed in said housing, said heat sink being made of a metal material, said charge balancing system comprising at least one battery state detection unit and at least one heat dissipation component electrically connected thereto, and said heat dissipation component being configured to dissipate overcharge energy of said secondary battery pack, which is characterized in that: said housing comprises a heat dissipation chamber and an accommodation chamber separated by a partition, said heat sink and said heat dissipation component being fixedly disposed in said heat dissipation chamber, said secondary battery pack and said battery state detection unit being disposed in said accommodation chamber, said battery state detection unit and said secondary battery pack being electrically connected, said battery state detection unit and said secondary battery pack corresponding thereto being electrically connected into a module form, and said battery state detection unit detecting a state of said secondary battery pack corresponding thereto in the same module to control charge/discharge of said secondary battery pack, said battery state detection unit comprising a detection unit, a comparison unit and a control unit being electrically connected, said detection unit being configured to detect the potential of said secondary battery pack, said comparison unit being provided with a pre-determined range value, and said control unit being configured to control discharge of said secondary battery pack being electrically connected thereto; hereby, said heat dissipation chamber and said accommodation chamber in said housing isolate said heat dissipation component with a relatively high operation temperature from said battery state detection unit and said secondary battery pack that have to maintain a relatively low operation temperature, said battery state detection unit independently detects the potential of said secondary battery pack, said comparison unit compares said pre-determined range value to the detected potential, and said control unit controls said secondary battery pack to discharge electric energy to said heat dissipation component when the potential of said secondary battery pack exceeds said pre-determined range value.

5. The secondary aggregate battery with spatial separation of operation temperatures according to claim 4, further comprising at least one connector set comprising a first connector and a second connector, wherein said first connector is electrically connected to said battery state detection unit, said second connector is electrically connected to said heat dissipation component, and said first connector is detachably coupled to said second connector.

6. The secondary aggregate battery with spatial separation of operation temperatures according to claim 4, wherein said secondary battery pack is connected to a main control unit and comprises a temperature switch, said temperature switch being attached onto said heat sink, said temperature switch being provided with a threshold value, said temperature switch being controllably connected to said main control unit, and said temperature switch being configured to detect a temperature such that said temperature switch controls said main control unit to turn off when said temperature exceeds said threshold value.

7. The secondary aggregate battery with spatial separation of operation temperatures according to claim 4, wherein said battery state detection unit further comprises a protection switch, said comparison unit being provided with a limit value such that said protection switch controls said secondary battery pack corresponding thereto to become an open circuit when the potential of said secondary battery pack reaches said limit value.

\* \* \* \* \*